UNITED STATES PATENT OFFICE.

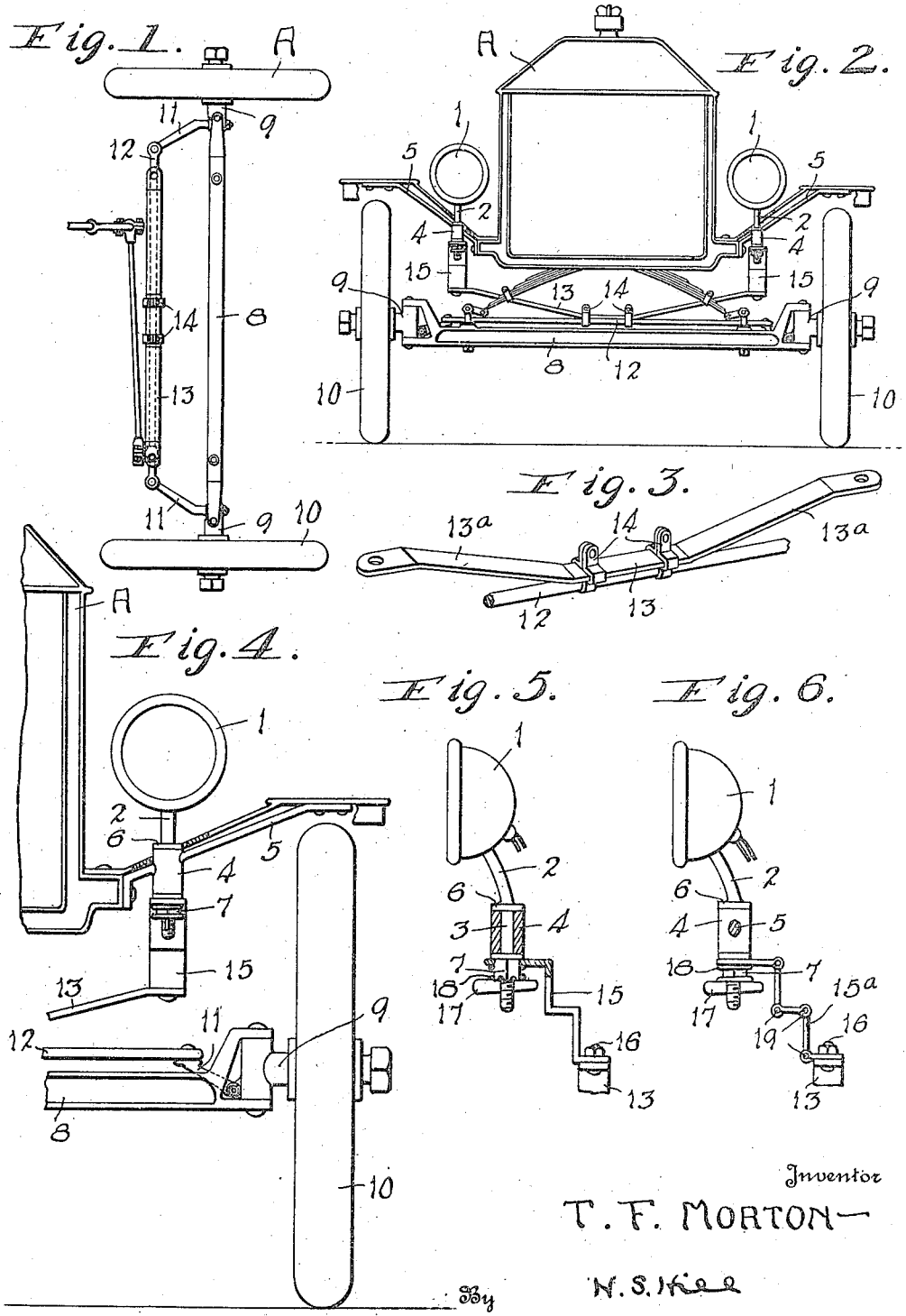

THOMAS F. MORTON, OF SABINSVILLE, PENNSYLVANIA.

DIRIGIBLE HEADLIGHT ATTACHMENT FOR AUTOMOBILES.

1,240,759. Specification of Letters Patent. Patented Sept. 18, 1917.

Application filed December 28, 1916. Serial No. 139,330.

*To all whom it may concern:*

Be it known that I, THOMAS F. MORTON, a citizen of the United States, residing at Sabinsville, in the county of Tioga, State of Pennsylvania, have invented a new and useful Dirigible Headlight Attachment for Automobiles; and I do hereby declare the following to be a full, clear, and exact description of the invention, such as will enable others skilled in the art to which it appertains to make and use the same.

The present invention relates to a dirigible headlight attachment for motor vehicles, and has for its object to provide a device of this character which embodies novel features of construction whereby the headlights can be connected up to the steering gear so as to turn from side to side as the front wheels are turned, thereby causing the lights always to be thrown in the direction in which the vehicle is moving and enabling sharp turns to be made with safety at night.

Further objects of the invention are to provide a dirigible headlight attachment which can be readily applied to many standard makes of automobiles for the purpose of operatively connecting the steering gear and headlights without the necessity of substituting new headlight mountings or making any material changes in the mechanism of the automobile, which is simple and inexpensive in its construction, which is dependable in its operation, and which will successfully withstand the wear and tear to which such a device is necessarily subjected when in use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of the front axle, wheels and steering mechanism of a conventional automobile, showing the manner of securing the lamp shifting bar to the spindle arm connecting rod.

Fig. 2 is a front elevation of a conventional automobile showing a dirigible headlight attachment constructed in accordance with the invention applied thereto.

Fig. 3 is a detail perspective view of the lamp shifting bar and a portion of the spindle arm connecting rod, removed from the automobile.

Fig. 4 is an enlarged front elevation of one side of the automobile.

Fig. 5 is a side elevation of one of the lamps and shifting mechanism, portions being broken away.

Fig. 6 is a view similar to Fig. 5 showing a slight modification.

Corresponding and like parts are referred to in the following description and indicated in all the views of the drawings by the same reference characters.

For the purpose of illustration the attachment is shown as applied to a conventional automobile A, the headlights 1 of which are carried by bracket arms 2 which terminate at their lower ends in spindles 3, said spindles passing through vertical bearing sleeves 4 which are formed in the bracket arms 5 provided for supporting the usual front mud guards. Shoulders 6 at the upper ends of the spindles 3 rest loosely upon the bearing sleeves 4, while the lower ends of the spindles are threaded to receive the retaining nuts 7. The numeral 8 designates the usual front axle which is provided at its ends with the spindles 9 upon which the front wheels 10 are journaled, said spindles being formed with the usual spindle arms 11 which are connected by a transverse rod 12, said rod being in turn operatively connected to the steering wheel so that it can be bodily moved longitudinally to turn the front wheels when it is desired to steer the vehicle either to the right or to the left. This is all of a well-known and conventional construction, and no claim to novelty is based thereon.

The dirigible headlight attachment includes a lamp shifting bar 13 which is arranged over the spindle arm connecting rod 12 and extends longitudinally thereof. The central portion of the lamp shifting bar 13 is rigidly secured by suitable fastening means such as the U-bolts 14 to the spindle arm connecting rod 12, while the end portions of the bar are offset upwardly, being connected to the middle portion thereof by the inclined arms 13ª. The extremities of the bar 13 are operatively connected to the headlights 1 by forwardly extending lamp turning levers 15, said levers having a substantially Z-shaped formation and being constructed of flat spring metal so that they will yield vertically and compensate for the up and down movements of the vehicle body relative to the running gear, such movements of the vehicle body being due to the fact that it is mounted upon springs. The rear arms of the Z-shaped lamp turning levers 15 are pivotally connected by bolts 16 to the ends of the lamp shifting bar 13, while the forward arms thereof are formed with polygonal openings of a suitable size and shape to receive the retaining nuts 7 of the headlight spindles 3. Keys 17 are employed for locking the retaining nuts 7 with the spindles 3, and springs 18 are interposed between the keys 17 and the lamp turning levers 15, thereby taking up any looseness and preventing any rattling of the parts when the vehicle is in motion. It will be obvious that this attachment can be applied to the vehicle, using the standard headlights and headlight mountings, and that it will operatively connect the headlights with the steering gear so that they will automatically turn with the front wheels and always project the light in the direction in which the vehicle is moving.

A slight modification is shown by Fig. 6, in which the lamp turning levers 15ª are shown as formed in sections which are connected by the hinge joints 19. These joints enable the lamp turning levers to absorb or compensate for the up and down movements of the vehicle body relative to the running gear, at the same time maintaining an operative connection between the headlights and the lamp shifting bar 13. The result is the same as though the lamp turning levers flexed, as in the previous instance, and it is optional whether these levers are formed of flexible material or constructed in hingedly connected sections.

Having thus described the invention, what I claim as new and desire to secure by Letters Patent, is:—

1. The combination with a motor vehicle having a spindle arm connecting rod and headlights carried by brackets terminating in spindles which are received within vertical bearing sleeves and have polygonal retaining nuts applied thereto, of a lamp shifting bar extending longitudinally of the spindle arm connecting rod and having the extremities thereof offset upwardly from its middle portion, means for clamping said middle portion of the lamp shifting arm to the spindle arm connecting rod, lamp turning levers pivotally connected to the extremities of the lamp shifting bar and provided with polygonal openings to receive the retaining nuts of the lamp spindles, keys for locking the nuts with the spindles, and springs interposed between the keys and the lamp turning levers to take up looseness.

2. The combination with a motor vehicle having a spindle arm connecting rod and headlights carried by brackets terminating in spindles which are received within vertical bearing sleeves and have retaining nuts applied thereto, of a lamp shifting bar extending longitudinally of the spindle arm connecting rod and having the extremities thereof offset upwardly from its middle portion, means for clamping said middle portion of the lamp shifting bar upon the spindle arm connecting rod, and lamp turning levers pivotally connected at one end to the extremities of the shifting lever and operatively connected at their opposite ends to the retaining nuts of the headlight spindles, said lamp turning levers being formed in hingedly connected sections to admit of the up and down movements of the vehicle body relative to the running gear.

In testimony whereof I have signed my name to this specification in the presence of two subscribing witnesses.

THOMAS F. MORTON.

Witnesses:
CHARLES B. GEE,
CLYDE DOTY.

Copies of this patent may be obtained for five cents each, by addressing the "Commissioner of Patents, Washington, D. C."